(12) United States Patent
Park

(10) Patent No.: US 7,342,783 B2
(45) Date of Patent: Mar. 11, 2008

(54) PORTABLE COMPUTER WITH DOCKING STATION

(75) Inventor: Jea-woo Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 11/294,586

(22) Filed: Dec. 6, 2005

(65) Prior Publication Data

US 2006/0126290 A1 Jun. 15, 2006

(30) Foreign Application Priority Data

Dec. 13, 2004 (KR) ...................... 10-2004-0104892

(51) Int. Cl.
*H05K 7/20* (2006.01)
(52) U.S. Cl. ...................... 361/687; 361/686; 361/712; 361/714; 165/80.3; 710/304
(58) Field of Classification Search ................ 361/686, 361/687, 689, 690–697, 704–712, 724, 699–701; 174/15.1, 15.2, 52.4, 252; 165/80.3, 80.4, 165/185, 104.33, 104.34, 104.21; 62/3.2, 62/3.7, 3.62, 259.2; 713/300, 310, 322, 330, 713/321, 349, 501; 710/304; 259/1, 428
See application file for complete search history.

(56) References Cited

U.S. PATENT DOCUMENTS

| | | | |
|---|---|---|---|
| 5,974,556 A | * | 10/1999 | Jackson et al. ............. 713/322 |
| 6,084,769 A | * | 7/2000 | Moore et al. ............... 361/687 |
| 6,172,871 B1 | | 1/2001 | Holung et al. |
| 6,181,553 B1 | * | 1/2001 | Cipolla et al. ............. 361/687 |
| 6,191,943 B1 | * | 2/2001 | Tracy .......................... 361/687 |
| 6,195,265 B1 | * | 2/2001 | Choi ........................... 361/799 |
| 6,219,233 B1 | * | 4/2001 | Moore et al. ............... 361/687 |
| 6,275,945 B1 | * | 8/2001 | Tsuji et al. ................. 713/300 |
| 6,276,448 B1 | * | 8/2001 | Maruno ....................... 165/185 |
| 6,415,612 B1 | * | 7/2002 | Pokharna et al. ............. 62/3.2 |
| 6,453,378 B1 | * | 9/2002 | Olson et al. ................ 710/304 |

(Continued)

FOREIGN PATENT DOCUMENTS

| | | |
|---|---|---|
| JP | 2002-182795 | 6/2002 |
| KR | 1999-34169 | 8/1999 |

(Continued)

OTHER PUBLICATIONS

Korean Office Action dated May 22, 2006 issued in KR 2004-104892.

*Primary Examiner*—Michael Datskovskiy
(74) *Attorney, Agent, or Firm*—Stanzione & Kim, LLP

(57) ABSTRACT

A portable computer system having a computer body and a display unit coupled to the computer body includes a docking station to be connectable to and disconnectable from the computer body, a heat discharging member provided on the computer body to cool a heat generating component mounted on the computer body, at least one first heat transmission member provided on the computer body and connected to the heat discharging member to be in contact with the docking station, and at least one second heat transmission member provided on the docking station to be in contact with the first heat transmission member and to discharge heat from the computer body. Thus, the portable computer system is capable of discharging the heat generated from the computer body through the docking station.

24 Claims, 4 Drawing Sheets

U.S. PATENT DOCUMENTS 6,646,874 B2 * 11/2003 Pokharna et al. ........... 361/687
6,687,123 B2 * 2/2004 Kitahara ..................... 361/695
6,865,077 B2 * 3/2005 Igarashi ...................... 361/687

FOREIGN PATENT DOCUMENTS

| KR | 2001-70544 | 7/2001 |
| KR | 2002-30570 | 4/2002 |

* cited by examiner

PORTABLE COMPUTER WITH DOCKING STATION

CROSS-REFERENCE TO RELATED APPLICATIONS

This application claims the benefit of Korean Patent Application No. 2004-0104892, filed on Dec. 13, 2004 in the Korean Intellectual Property Office, the disclosure of which is incorporated herein by reference.

BACKGROUND OF THE INVENTION

1. Field of the Invention

The present general inventive concept relates to a portable computer system, and more particularly, to a portable computer system having a computer body and a docking station detachably attached to the computer body.

2. Description of the Related Art

Generally a portable computer comprises a display unit forming a picture thereon, and a computer body supporting the display unit, on which various hardware units are mounted. Recently, the portable computer is provided with a docking station connectable to and detachable from the computer body whereby the portable computer can have various functions like a desktop computer.

The docking station includes a hardware frame and a series of interfaces for electric connection whereby the portable computer is capable of providing various functions like the desktop computer. These interfaces allow the computer body to communicate with auxiliary storage devices, such as a CD-ROM drive or a backup drive mounted on the docking station, and a local printer.

A conventional portable computer having a docking station is disclosed in Korean Patent First Publication No. 10-2002-0030570. The conventional portable computer comprises a computer body formed with an opening on one side thereof opposite to a connector of a docking station and having a main board, a peripheral component interface (PCI) slot mounted on the main board adjacent to the opening, and a docking connector detachably mounted on the PCI slot to be connected to the connector of the docking station.

The conventional portable computer is capable of making the computer body slimmer by providing the docking station which can be electrically connected to the computer body.

However, this conventional portable computer generates a large amount of heat from hardware units mounted on the computer body during operation. In this regard, if the docking station is mounted on the computer body, it is difficult to discharge the heat generated from the computer body. Taking this into consideration, it is necessary to improve a configuration of the portable computer so that the heat generated from the computer body can be discharged through the docking station.

SUMMARY OF THE INVENTION

The present general inventive concept provides a portable computer system capable of discharging heat generated from a computer body through a docking station.

Additional aspects and/or advantages of the present general inventive concept will be set forth in part in the description which follows and, in part, will be obvious from the description, or may be learned by practice of the present general inventive concept.

The foregoing and/or other aspects of the present general inventive concept may be achieved by providing a portable computer system having a computer body and a display unit coupled to the computer body, the portable computer system comprising a docking station to be connectable to and disconnectable from the computer body, a heat discharging member provided on the computer body to cool a heat generating component mounted on the computer body, at least one first heat transmission member provided on the computer body to be connected to the heat discharging member so as to be contactable with the docking station, and at least one second heat transmission member provided on the docking station to be contactable with the first heat transmission member and to discharge heat from the computer body.

The portable computer system may further comprise a docking shield provided on the docking station and made of a material having thermal conduction, wherein the second heat transmission member is coupled to the docking shield.

The heat discharging member may comprises a heat pipe connected to the heat generating component of the computer body, and a heat sink connected to the heat pipe and cooling the heat pipe, and the first heat transmission member is connected to at least one of the heat pipe and the heat sink.

The portable computer system may further comprise a body shield made of a conductive material to shield electromagnetic waves generated from the computer body.

The portable computer system may further comprise a passing unit provided on the body shield, and through which the first heat transmission member is allowed to pass without contacting the body shield.

The portable computer system may further comprises at least one first contact member provided outside the computer body, connected to the body shield, and coupled to the docking station, and at least one second contact member provided on the docking station to be in contact with the first contact member, which is connected to the docking shield.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
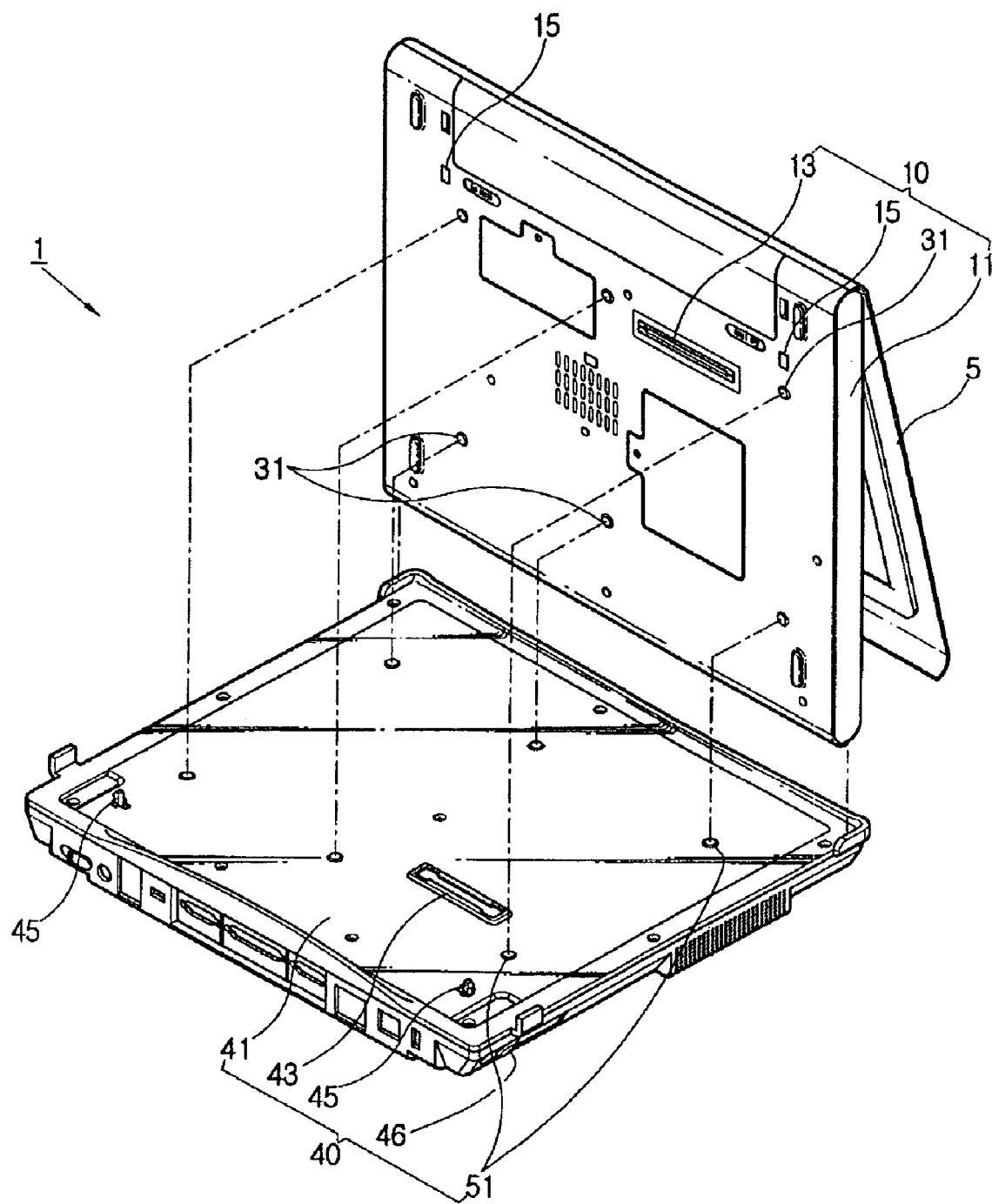
FIG. 1 is an exploded perspective view illustrating a portable computer system having a computer body and a docking station according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
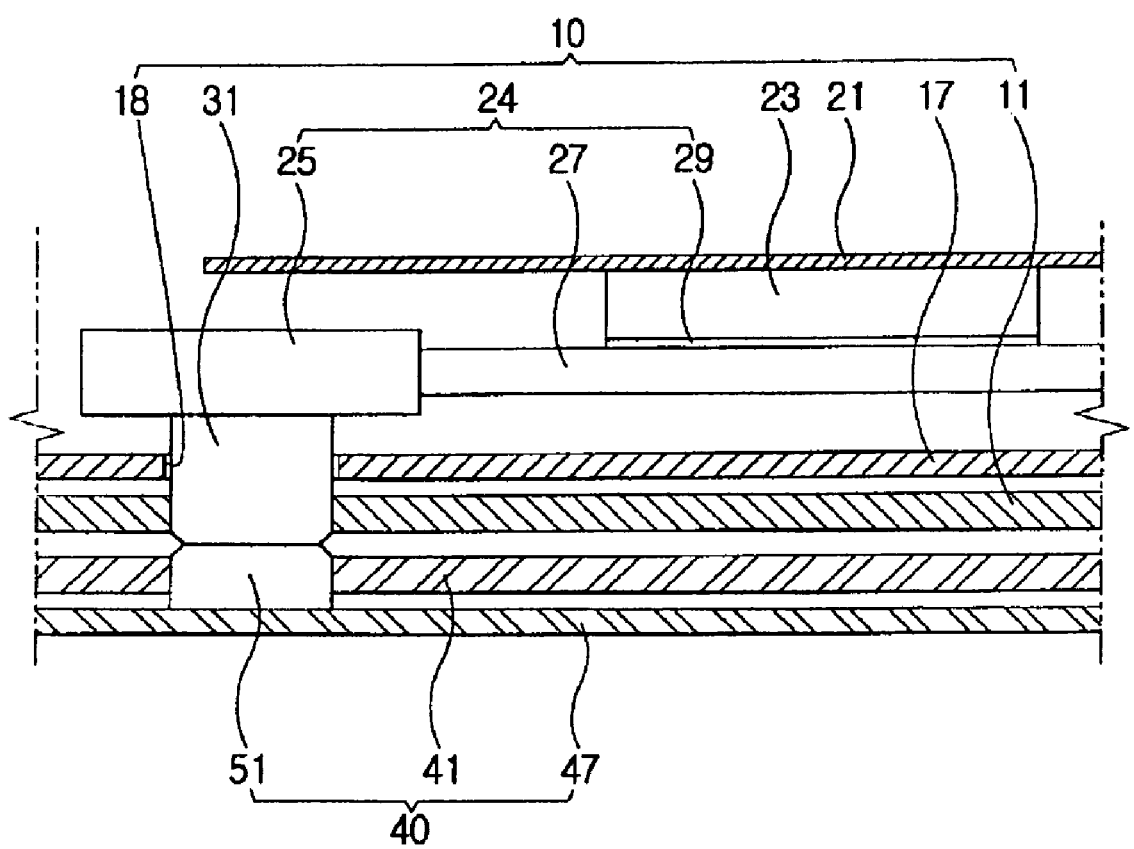
FIG. 2 is a sectional view illustrating a partial connection of the computer body and the docking station of FIG. 1.

FIG. 1 is an exploded perspective view illustrating a portable computer system 1 having a computer body 10 and a docking station 40 according to an embodiment of the present general inventive concept, and FIG. 2 is a sectional view illustrating a partial connection of the portable body 10 and the docking station 40 of FIG. 1. As illustrated in FIGS. 1 and 2, the portable computer system 1 comprises the computer body 10 having a display unit 5 to receive a picture signal generated and inputted from the computer body 5 and to output an image corresponding to the received picture signal thereon, the docking station 40 to be connectable to and detachable from the computer body 10, a heat discharging member 24 provided on the computer body 10 to cool a heat generating component 23 mounted on the computer body 10, at least one first heat transmitting member 31 connected to the heat discharging member 24 and provided on the computer body 1 to be in contact with the docking station 40, and at least one second heat transmitting member 51 provided on the docking station 40 to be in contact with the first heat transmitting member 31, thereby discharging heat generated from the computer body 10.

The computer body 10 includes a body casing 11 defining an external appearance thereof, an input unit (not shown), such as a keyboard, provided on a top of the body casing 11 to allow a user to input data or the like, and a heat generating component 23, such as a central processing unit (CPU), mounted on a circuit board 21 within the body casing 11 to generate the heat at a high temperature. On the computer body 10 is provided a body shield 17 capable of shielding electromagnetic waves generated from one or more components disposed inside of the computer body 10.

On the body casing 11 are provided a body connector 13 connected to a docking connector 43 provided on the docking station 40 to be described later, and a hook coupling unit 15 connected to and disconnected from a hook 45 provided on the docking station 40 to be described later.

The body connector 13 is provided with an IEEE1394 interface mechanism so that the body connector 13 connected to the docking connector 43 of the docking station 40 can transmit power and data to the docking station 40 from the computer body 10 or the docking station 40. However, the body connector 13 is not limited to the IEEE 1394 interface mechanism and may be provided with other kinds of interfaces, for example, a USB interface mechanism.

The body shield 17 may have a shape of a plate between the body casing 11 and one or more electronic components, such as the CPU, provided on the body casing 11, so as to shield electromagnetic waves generated from the electronic components. On the body shield 17 is provided a passing unit 18 through which the first heat transmitting member 31 passes. The passing unit 18 is large enough to provide a gap between the body shield 17 and the at least one first heat transmitting member 31, so that the body shield 17 is not in contact with the first heat transmitting member 31. According to this structure of, heat transmission from the first heat transmitting member 31 to the main body shield 17 can be prevented because the first heat transmitting member 31 is not connected to the body shield 17 but the first heat transmission member 31.

The heat discharging member 24 includes a heat pipe 27 connected to the heat generating component 23, and a heat sink 25 connected to the heat pipe 27, thereby cooling the heat pipe 27. The heat discharging member 24 may further include a cooling fan (not shown) mounted on the heat sink 25, thereby forcibly cool the heat sink 25. The heat sink 25 and the heat pipe 27 may constitute a heat transferring unit to transfer the heat outside the one or more electronic components.

The heat pipe 27 is made by inserting liquid, such as water or alcohol, within a pipe formed of a material, such as copper, having high thermal conduction, and sealing up both ends thereof. One side of the heat pipe 27 is connected to the at least one heat generating component 23 and the other side thereof is connected to the heat sink 25 whereby the heat generated from the heat generating component 23 is discharged toward the heat sink 25, thereby cooling the heat generating component 23. The one side of the heat pipe 27 is attached to the heat generating component 23 by an adhesive pad 29 made of a material having high thermal conduction. However, the one side of the heat pipe 27 may be coupled to the heat generating component 23 by a different coupling unit, such as the adhesive pad 29.

The first heat transmission member 31 may be connected to at least one of the heat pipe 27 and the heat sink 25. Although FIGS. 1 and 2 illustrate the first heat transmission member 31 connected to the heat sink 25 and projected externally from the body casing 11 so as to be in contact with the second heat transmission member 51, the present inventive concept is not limited thereto. As illustrated in FIG. 1, the portable computer system may comprise a plurality of first heat transmission members 31 which correspond to heat generating components 23 to transfer the heat to an outside of the outer body 10, and are made of such a material having high thermal conduction.

The docking station 40 comprises a docking casing 41 defining an external appearance of the docking station 40, a docking connector 43 provided on the docking casing 41 to be connected to the body connector 13 of the computer body 10, a hook 45 provided on the docking casing 41 to be connected to and disconnected from the hook coupling unit 15 of the computer body 10, and a disconnection button 46 connected to the hook 45 so as to allow the hook 45 to be disconnected from the hook coupling unit 15 of the computer body 10.

Accordingly, the docking station 40 can be connected to the computer body 10 by coupling the hook 45 to the hook coupling unit 15 of the computer body 10, and be disconnected from the computer body 10 by pressing the disconnection button 46 of the docking station 40 to disconnect the hook 45 from the hook coupling unit 15 of the computer body 10. On the docking station 40 is provided a docking shield 47 between the docking casing 41 and a circuit unit (not shown).

The docking shield 47 is coupled to the second heat transmission unit 51 to receive the heat transmitted from the second heat transmission unit 51. The docking shield 47 may have a shape of a plate made of a material having high thermal conduction so as to easily discharge the heat transmitted from the second heat transmission member 51 outside the docking station 40. The docking shield 47 is provided between electronic components and the docking casing 41 to shield electromagnetic waves generated from electronic components provided within the docking station 40.

The second heat transmission member 51 is projected externally from the docking casing 41 so as to be contactable with the first heat transmission member 31. The docking station 40 may have a plurality of second heat transmission members 51, as shown in FIG. 1, which correspond to the first heat transmitting members 31 and are made of a material having high thermal conduction.

With this configuration, an operation of the portable computer 1 according to the embodiment of the present general inventive concept will be described.

The computer body 10 is connected to the docking station 40, and the first heat transmission member 31 provided on the computer body 10 is in contact with the second heat transmission member 51 provided on the docking station 40. As the computer body 10 is operated, the heat generating component 23 within the computer body 10 generates heat, and the heat is cooled through the heat discharging member 24. At this time, the heat generated inside the computer body 10 may be cooled by the heat discharging member 24 or by allowing the heat to be discharged to the docking shield 47 through the first heat transmission member 31 and the second heat transmission member 51 connected to the heat discharging member 24.

As described above, the portable computer system 1 according to this embodiment of the present general inventive concept can discharge the heat generated in the computer body 10 through the docking station 40, thereby improving a cooling efficiency of the computer body 10.

Figure 3:
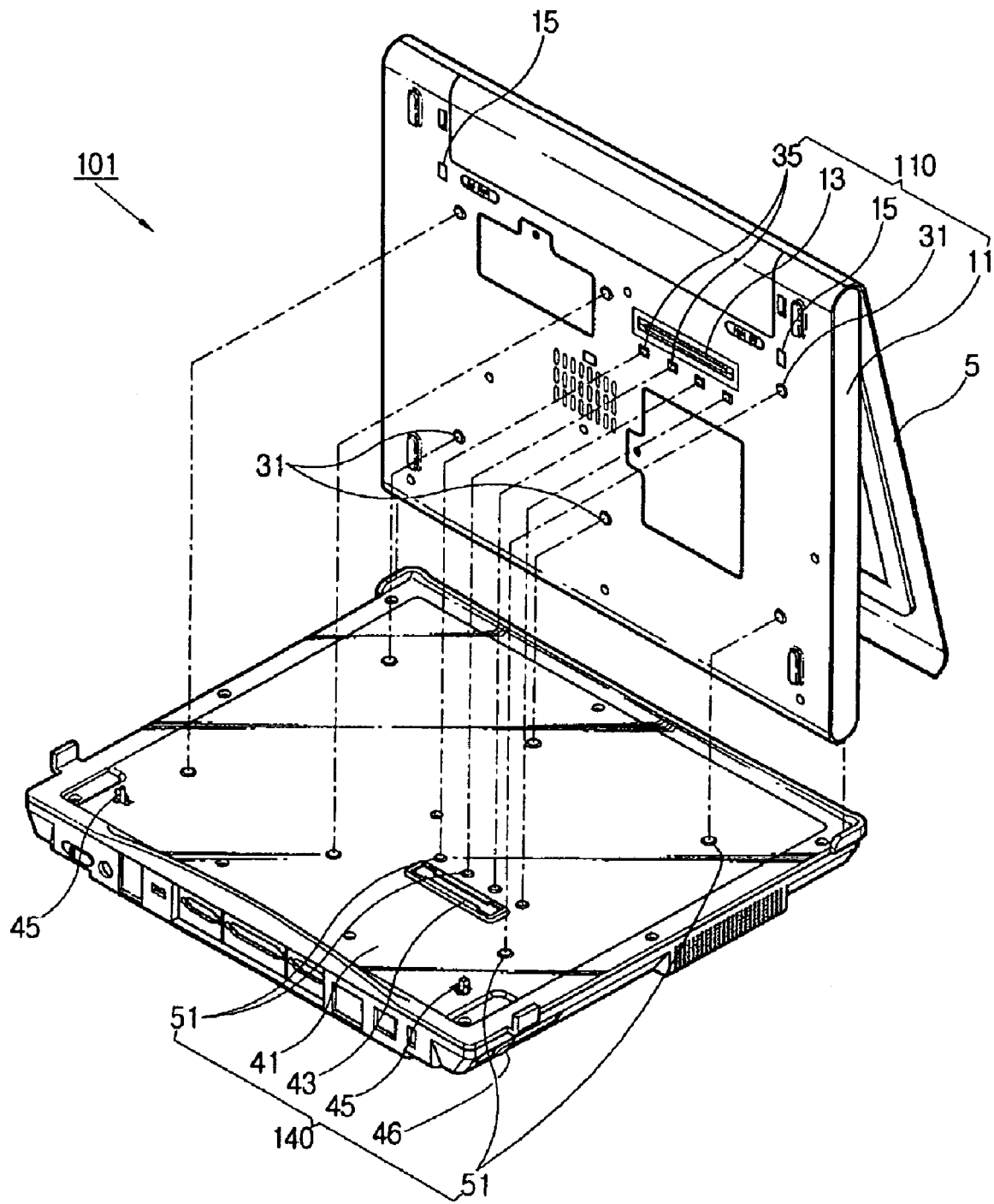
FIG. 3 is an exploded perspective view illustrating a portable computer system having a computer body and a docking station according to an embodiment of the present general inventive concept.
Figure 4:
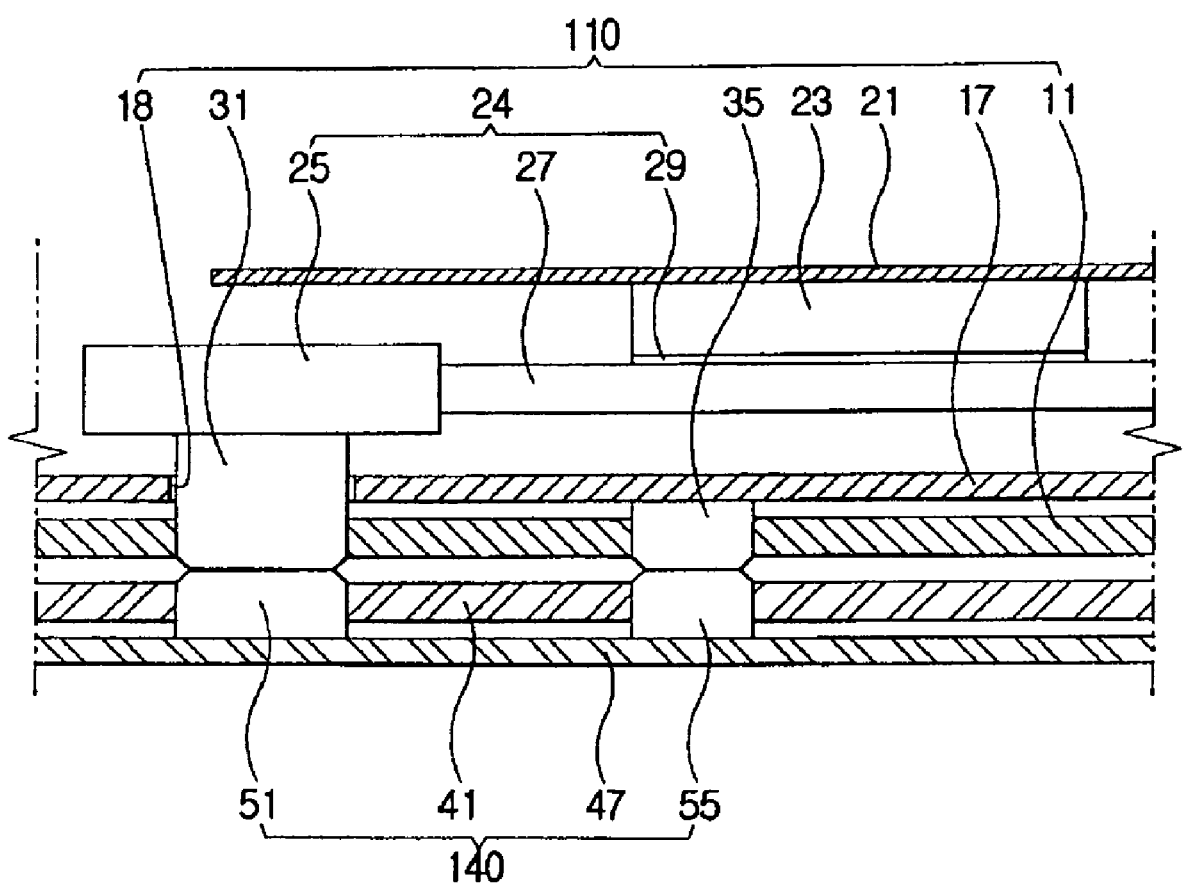
FIG. 4 is a sectional view illustrating a partial connection of the computer body and the docking station of FIG. 3.

FIG. 3 is an exploded perspective view illustrating a portable computer system 101 having a computer body 110 and a docking station 140 according to an embodiment of the present general inventive concept, and FIG. 4 is a sectional view illustrating a partial connection of the computer body 110 and the docking station 140 of FIG. 3. As illustrated in FIGS. 3 and 4, the portable computer system 101 is different from the portable computer system 1 of FIG. 1 in that the portable computer system 101 further comprises at least one first contact member 35 provided on the computer body 110, and a second contact member 55 provided on the docking station 140 to thereby be in contact with the first contact member 35. The computer body 110 and the docking station 140 may have one or more holes through which the at least one first contact member 35 and the at least one second contact member 55 protrude from the computer body 110 and the docking station 140, respectively, as shown in FIGS. 3 and 4.

The first contact member 35 is connected to the body shield 17, and is projected externally from the body casing 11 to thereby be contactable with the second contact member 140. As illustrated in FIG. 3, the portable computer system 101 may have a plurality of first contact members 35 made of a material having high conduction.

The second contact member 55 is connected to the docking shield 47 and is projected externally from the docking station 41 to thereby be in contact with the first contact member 35.

As illustrated in FIG. 3, the portable computer system 101 may have a plurality of second contact member 55 which correspond to the plurality of second contact members 35 and are made of a material having high conduction.

Since the portable computer system 101 illustrated in FIGS. 3 and 4 are similar in configuration to the portable computer system 1 of FIGS. 1 and 2, detail descriptions of the portable computer system 101 will be omitted.

With this configuration, a potential difference between the body shield 17 and the docking shield 47 is removed by contacting the first contact member 35 provided on the body casing 11 with the second contact member 140 provided on the docking station 41, thereby extending an effect of shielding electromagnetic waves of the body shield 17 and the docking shield 47.

As described above, the portable computer system 101 can enhance electro-magnetic compatibility (EMC) by electrically connecting the body shield 17 and the docking shield 47 to thereby extend the electromagnetic wave shielding effect.

As described above, according to the present general inventive concept, a portable computer is capable of enhancing a cooling efficiency of the computer body since the heat generated from the computer body can be discharged through the docking station.

Further, a portable computer is capable of enhancing EMC by electrically connecting the body shield and the docking shield to thereby increase the electromagnetic wave shielding effect.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computer system having a computer body and a display unit coupled to the computer body, the portable computer system comprising:
    a docking station to be connectable to and disconnectable from the computer body;
    a heat discharging member provided on the computer body to cool a heat generating component mounted on the computer body;
    a docking shield provided on the docking station and including a material having thermal conduction;
    at least one first heat transmission member provided on the computer body to be connected to the heat discharging member and to be connected with the docking station; and
    at least one second heat transmission member coupled to the docking shield to be in contact with the first heat transmission member to discharge the heat from the computer body.

2. The portable computer system according to claim 1, wherein:
    the heat discharging member comprises a heat pipe connected to the heat generating component of the computer body, and a heat sink connected to the heat pipe and cooling the heat pipe; and
    the first heat transmission member is connected to at least one of the heat pipe and the heat sink.

3. The portable computer system according to claim 1, wherein:
    the heat discharging member comprises a heat pipe connected to the heat generating component of the computer body, and a heat sink connected to the heat pipe and cooling the heat pipe; and
    the first heat transmission member is connected to at least one of the heat pipe and the heat sink.

4. The portable computer system according to claim 1, further comprising:
    a body shield made of a conductive material and to shield electromagnetic waves generated from the computer body.

5. The portable computer system according to claim 4, wherein the body shield comprises a passing unit provided thereon, and the first heat transmission member is allowed to pass through the passing unit without contacting the body shield.

6. The portable computer system according to claim 5, further comprising:
    at least one first contact member provided outside the computer body, connected to the body shield and coupled to the docking station; and
    at least one second contact member provided on the docking station to be in contact with the first contact member, which is connected to the docking shield.

7. The portable computer system according to claim 4, further comprising:
   at least one first contact member provided outside the computer body, connected to the body shield and coupled to the docking station; and
   at least one second contact member provided on the docking station to be in contact with the first contact member, which is connected to the docking shield.

8. A portable computer body useable with a portable computer system, comprising:
   a heat generating component to generate heat;
   a heat transferring unit in heat conducting relationship with the heat from the generating component;
   a body casing to accommodate the heat generating component and the heat transferring unit, and having a plurality of passing units formed thereon to communicate with an outside of the body casing; and
   a plurality of heat transmitting members formed on the heat transferring unit and respectively disposed in the passing units to distribute the heat to the outside of the body casing at multiple locations thereon.

9. The portable computer body according to claim 8, wherein the heat transmitting members include a first portion connected to the heat transferring unit and disposed inside of the body casing, and a second portion extended from the first portion to protrude toward the outside of the body casing through the corresponding one of the passing units.

10. The portable computer body according to claim 8, wherein the passing units each forms a a with the corresponding one of the heat transmitting members, and the heat is transmitted through the gap and the corresponding one of the heat transmitting members.

11. The portable computer body according to claim 8, wherein the passing units are removed from contact with the at least one heat transmitting member.

12. The portable computer body according to claim 8, wherein the heat transferring unit and the heat transmitting members are made in a single body.

13. A portable computer system, comprising:
   a computer body having a display unit, the computer body comprising:
      a circuit board having a heat generating component mounted thereon to generate heat;
      a heat transferring unit to transfer the heat from the generating component;
      a body casing to accommodate the circuit board and the heat transferring unit;
      a body shield disposed between the circuit board and the body casing to shield an electromagnetic wave generating from the circuit board;
      a first passing unit and a second passing unit respectively formed on the body casing to provide a passage between an inside and an outside of the computer body;
      at least one contact member formed on the body shield and disposed in the second passing unit; and
      at least one heat transmitting member formed on the heat transferring unit and disposed in the passing unit to transmit the heat to the outside of the computer body.

14. The portable computer system according to claim 13, wherein the at least one heat transmitting unit protrudes from the body casing toward an outside of the body casing.

15. The portable computer system according to claim 13, wherein the computer body further comprises a connector connected to the circuit board to be connected to an external device, and the at least one contact member is disposed adjacent to the connector.

16. The portable computer system according to claim 15, wherein the second passing unit is disposed adjacent to the connector.

17. The portable computer system according to claim 15, wherein the first passing unit is spaced-apart from connector by a first distance, and the second passing unit is spaced apart from the connector by a second distance.

18. The portable computer system according to claim 13, wherein the at least one contact member protrudes from the body casing toward an outside of the body casing.

19. The portable computer system according to claim 13, wherein the at least one contact member protrudes from the body casing toward an outside of the body casing.

20. The portable computer system according to claim 13, further comprising:
   a docking station comprising a docking shield, a docking casing to face the body casing of the computer body, a hole formed on the docking casing, and at least one second heat transmitting member formed on the docking shield and disposed in the hole to be in contact with the at least one heat transmitting member to transmit the heat between the computer body and the docking station.

21. The portable computer system according to claim 20, wherein the docking station further comprises:
   a second hole formed on the docking casing; and
   at least one second contact member formed on the docking shield and disposed in the second hole to contact the at least one contact member so that the body shield and the docking shield can be electrically connected.

22. The portable computer system according to claim 13, further comprising:
   a docking station comprising a docking shield, a docking casing to face the body casing of the computer body, a hole formed on the docking casing, and at least one second heat transmitting member formed on the docking shield and disposed in the hold to be in contact with the at least one heat transmitting member.

23. The portable computer system according to claim 22, wherein:
   the computer body further comprises:
      a second passing unit formed on the body casing, and
      at least one contact member formed on the body shield and disposed in the second passing unit; and
   the docking station further comprises:
      a second hole formed on the docking casing, and
      at least one second contact member formed on the docking shield and disposed in the second hole to contact the at least one contact member so as to control a potential difference between the body shield and the docking shield.

24. A portable computer system comprising:
   a computer body to house at least one heat generating element therein;
   a docking station to electrically couple to the computer body;
   a body shield in the computer body to inhibit electromagnetic radiation generated therein;
   a docking shield in the docking station to inhibit electromagnetic radiation generated therein; and
   a heat dissipation system to conduct heat from the heat generating element in the computer body and to dissipate the heat in the docking station.

* * * * *